Oct. 3, 1933.  E. A. ROCKWELL  1,928,633
POWER UNIT
Filed Feb. 19, 1931   5 Sheets-Sheet 2

Inventor:
Edward A. Rockwell,

Oct. 3, 1933.    E. A. ROCKWELL    1,928,633
POWER UNIT
Filed Feb. 19, 1931     5 Sheets-Sheet 3
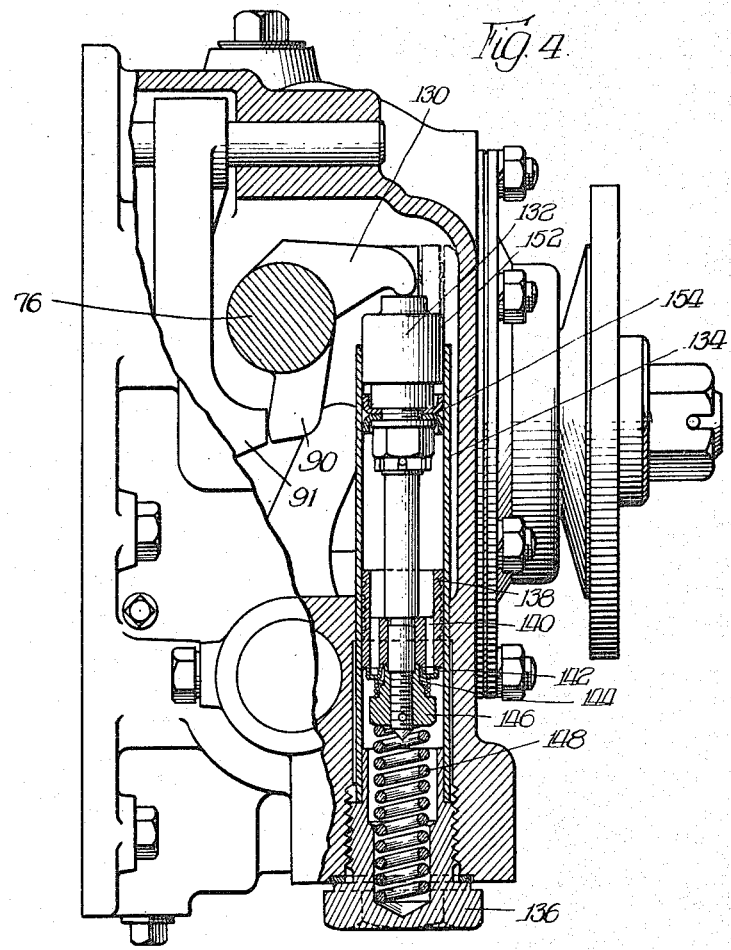
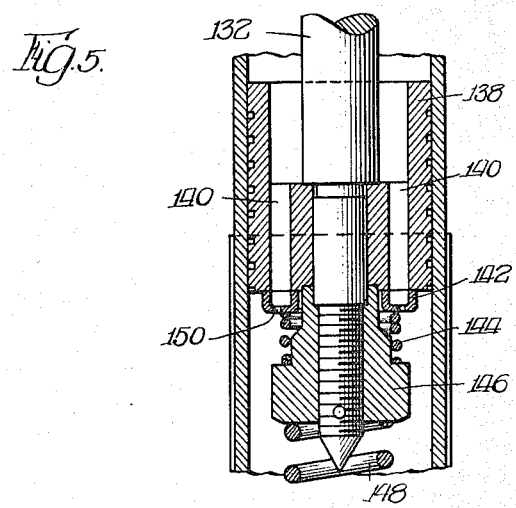
Inventor:
Edward A. Rockwell,

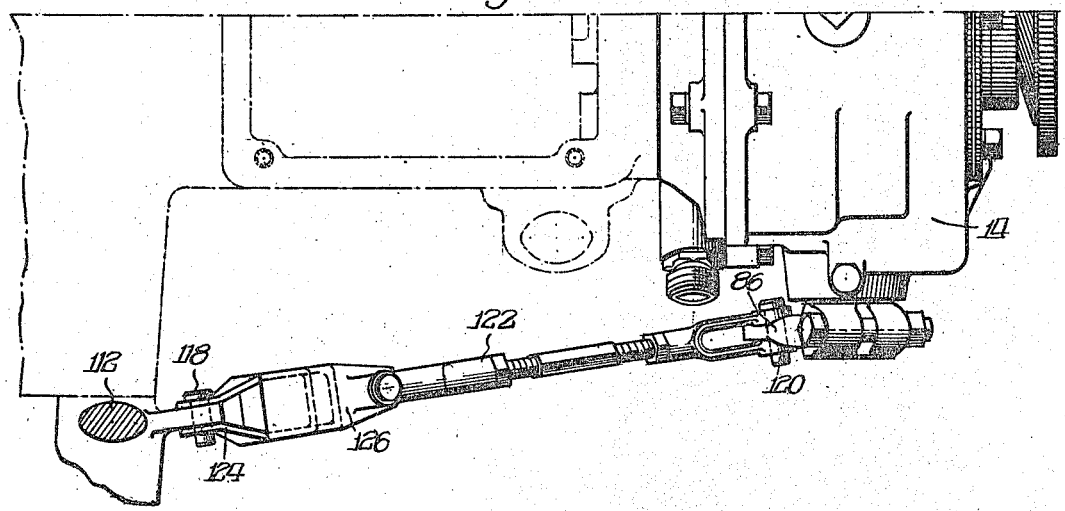
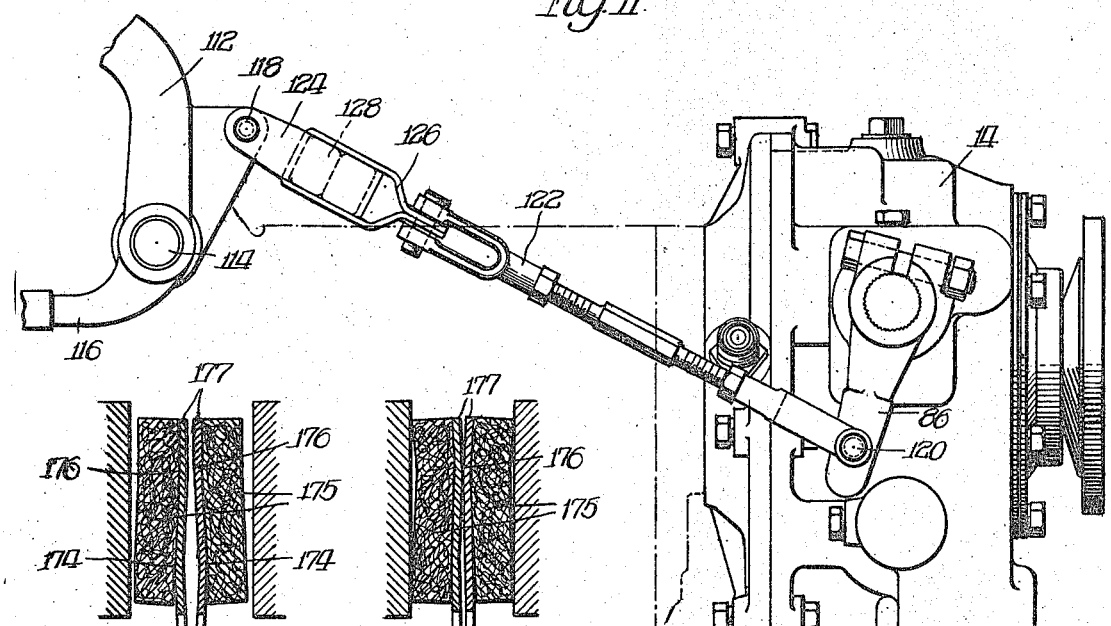
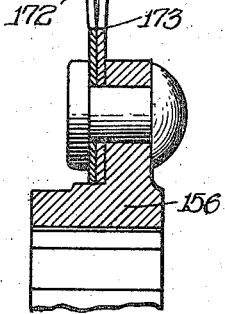
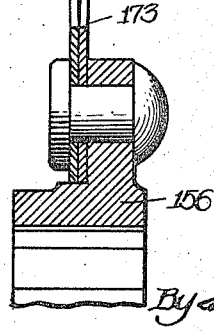

Oct. 3, 1933.   E. A. ROCKWELL   1,928,633
POWER UNIT
Filed Feb. 19, 1931   5 Sheets-Sheet 5

Inventor:
Edward A. Rockwell,

Patented Oct. 3, 1933

1,928,633

UNITED STATES PATENT OFFICE 1,928,633

POWER UNIT

Edward A. Rockwell, Chicago, Ill.

Application February 19, 1931
Serial No. 516,888

11 Claims. (Cl. 188—140)

This invention relates to improvements in power brake mechanisms particularly adapted to be used in connection with motor vehicles for amplifying the energies supplied by the operator of the vehicle.

The present invention is an improvement over my previously-filed application, Serial No. 421,707, filed January 18, 1930, in which I have disclosed a power brake casing mounted immediately in rear of the transmission casing concentric with respect to the propeller shaft and including therein a normally rotatable but retardable braking disk which may be frictionally retarded through the movement of a non-rotatable but laterally movable brake plate to which pressure may be applied under the control of the operator. According to this previous invention, the brake disk is yieldably driven from the propeller shaft through relatively displaceable oppositely spiralled sleeves which are initially held in normal driving position by the resistance to movement of the output brake linkage connected to the wheel brakes of the vehicle.

It is an object of the present invention to provide an improved design of the normally rotatable but retardable brake disk in order that the braking action may be more carefully controlled by the operator at relatively high speeds as well as low speeds of the vehicle.

It is a further object of the invention to so design the invention that the assembly is made relatively more easy and the casing design is such that the speedometer drive shaft is carried by the end plate of a casing.

A further feature of the present invention consists in the provision of the input brake linkage including resilient members which cooperate with an input dash pot within the power brake casing in order to limit the rate at which the operator may build up braking pressure applied to the laterally movable brake plate.

Further objects and advantages of the present improvements will be more readily apparent from the following description taken in connection with the attached drawings, in which—

Figure 4 is a side view of the power brake device partially in section to show the internal construction of the dash pot;

Figure 5 is an enlarged detail section of a portion of the dash pot;

Figure 6 is a plan view of the normally rotatable but retardable brake disk;

Figure 7 is an enlarged detail transverse section of a portion of the disk brake element shown in Figure 6 in released position;

Figure 8 is a detail section similar to Figure 7 of a modified construction shown in released position;

Figure 9 is a detail section similar to Figure 8 shown in partially applied position;

Figure 10 is a plan view of a portion of the input linkage and power brake housing;

Figure 11 is a side view of the input linkage and the power brake housing;

The general arrangement of the elements in my power brake device will be found to be in many respects similar to the construction previously shown in my application, Serial No. 421,707, filed January 18, 1930. The modifications and improvements in the present invention result in improved operation as will be particularly pointed out in the following description.

Figure 1:
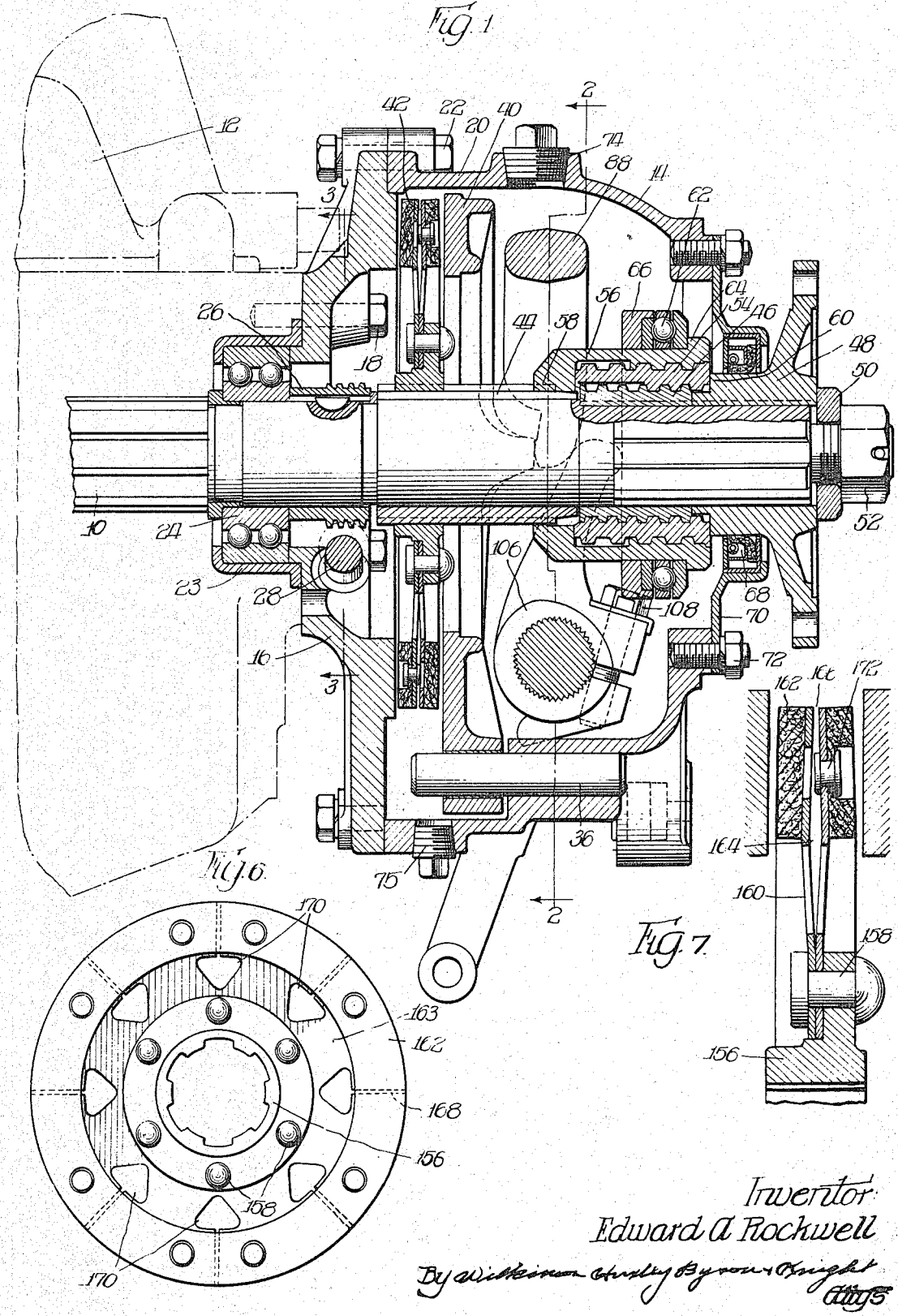
Figure 1 is a longitudinal vertical section of the power brake device.
Figure 3:
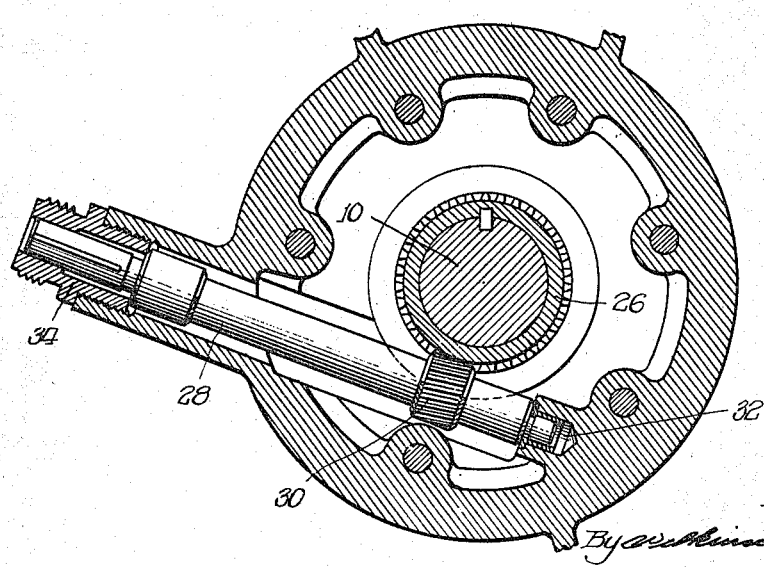
Figure 3 is a detail transverse vertical section taken on the plane indicated 3—3 in Figure 1.

As is well understood, the power brake unit is mounted in association with a propeller shaft 10 of a vehicle immediately in rear of the transmission housing diagrammatically indicated at 12, in Figure 1. The power brake housing is generally indicated 14 and comprises an adapter plate 16 which may be secured to the transmission housing by suitable bolts 18 and a main casing 20 secured to the adapter plate by bolts 22. The adapter plate serves to hold in place, in an opening of the transmission housing, a roller bearing retainer member 22 which receives the roller bearing 24. Immediately in rear of the roller bearing 24 a speedometer worm 26 is supported which, as shown in detail in Figure 3, drives a shaft 28 through gear 30. The shaft 28 is supported at one end by a bearing 32 inserted in an opening of the adapter plate and at the other end by a threaded plug 34 secured to a boss of the adapter plate and forming a connection to attach the speedometer drive.

The main casing 14 has mounted therein a lower pin 36 and a pair of upper pins 38. The pins 36 and 38 serve to support a non-rotatable but laterally movable input braking member 40. Between the laterally movable brake plate 40 and the adapter plate 16 is positioned a normally rotatable but retardable disk-shaped brake element, generally indicated 42. It will be understood that the disk brake element 42 is yieldably driven by the shaft 10 so that it normally rotates as a unit therewith but frictional retardation applied thereto, due to movement of the brake plate 40 towards the fixed adapter plate 16, tends to produce a relative rotation of the disk-shaped brake element 42 with respect to the shaft 10 in either direction of its rotation and the relative rotation is opposed by the resistance to movement of the output brake linkage, which connects to the wheel brakes of the vehicle.

The manner of obtaining the yieldable drive for the disk-shaped brake element 42 is substantially similar to that described in my previously mentioned application. Thus the disk-shaped brake element 42 is keyed for axial movement with respect to a sleeve member 44 rotatably carried by the shaft 10. Immediately in rear of the sleeve 44 is an inner exteriorly-spirally threaded sleeve 46 keyed to the shaft 10 and held in place by a universal drive connection 48 which, in turn, is held in place by a washer 50 and nut 52 threaded to the end of the shaft. The inner spiral sleeve 46 is coupled to an intermediate spirally-threaded member 54 which has an internal spiral corresponding to the spiral thread on sleeve 46 and an external oppositely spiralled thread. An outer spirally-threaded sleeve 56 is coupled to the intermediate sleeve 54 by an internal spiral thread and is keyed by the flange 58 for rotation with the splined sleeve 44 which drives the disk-shaped brake element 42. The intermediate sleeve 54, in its retracted position, abuts against a shoulder 60 of the universal drive connection 48 while the rearward movement of the outer sleeve 56 is limited by the flange 58 which abuts against the forward end of the intermediate sleeve 54. The outer sleeve 56 carries a rotatable thrust bearing 62 which abuts against a shoulder 64 of the sleeve 56. The thrust bearing unit 62 includes a thrust ring 66 of softer metal than the internal race rings thereof, as fully described in my prior application, Serial No. 365,071, filed May 16, 1929.

The casing 14 is sealed against the escape of oil by an oil seal unit 68 stationarily held in sealing contact with the rotatable universal drive connection 48 by a cover member 70 secured by bolts 72 to the casing member 20. The plug 74 at the top of the casing member 14 serves to close an opening through which oil may be introduced into the power brake housing and a drain plug 75 is provided at the bottom of the casing.

Figure 2:
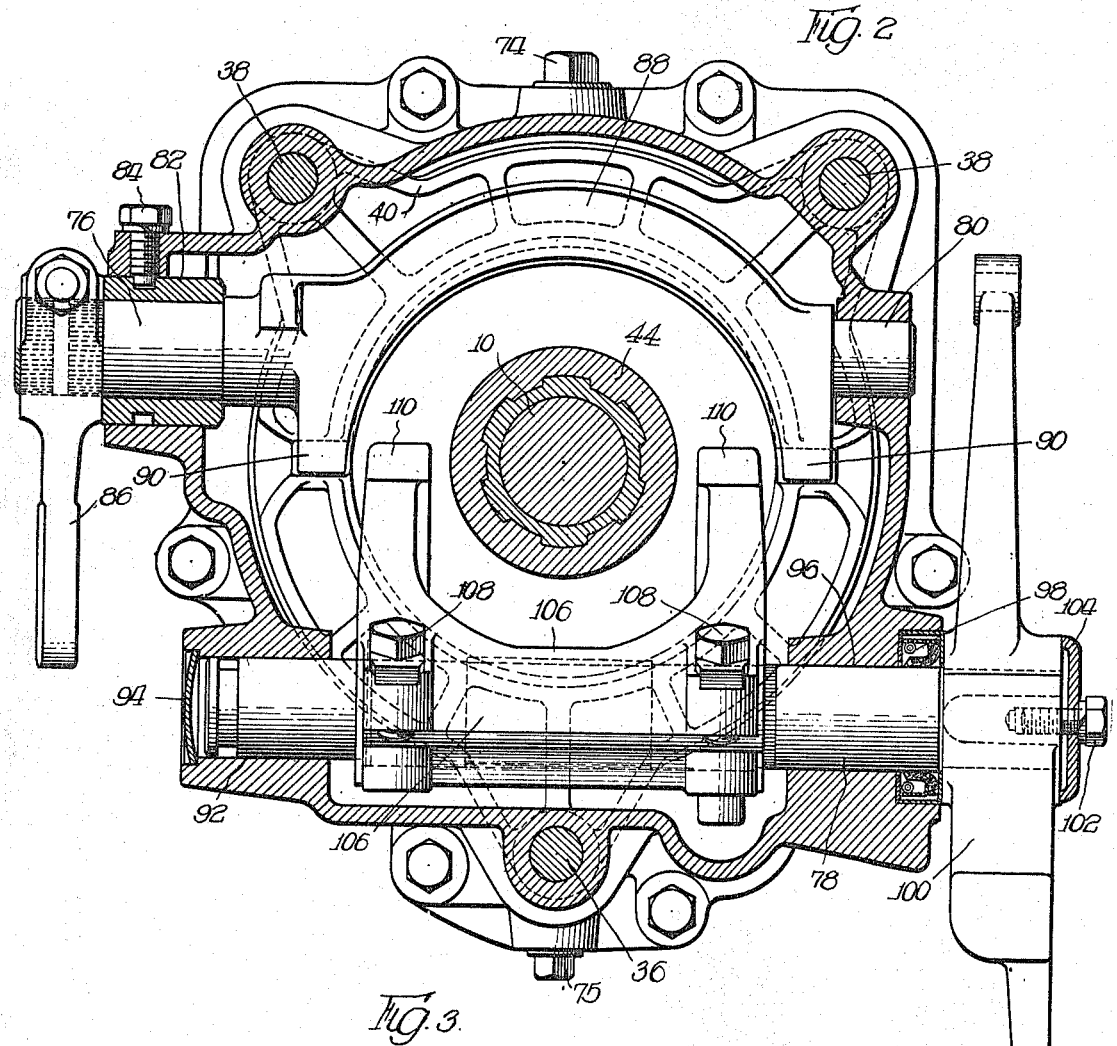
Figure 2 is a transverse vertical section taken on the plane indicated 2—2 in Figure 1.

As shown in Figure 2, the housing member 20 supports an upper input rock shaft 76 and a lower output rock shaft 78. The input rock shaft 76 is supported at one end by the bearing 80 and at the other end by a removable bearing 82 held in place by bolt 84. The rock shaft 76 protrudes outside of the power brake housing at one end and has attached thereto an input brake lever 86. The rock shaft 76 within the power brake housing is yoke-shaped in formation, as indicated at 88, to extend above the propeller shaft 10. The yoke-shaped portion of the input rock shaft 76 includes a pair of thrust arms 90 which bear in thrust engagement with abutments 91 of the movable brake plate 40 and transmit lateral movement thereto upon rotation of the rock shaft.

The output rock shaft is carried at one end by a bearing 92 formed in the casing 20 and the bearing opening is closed by a disk 94. The other end of the shaft protrudes from the casing through a bearing 96 which is sealed against leakage of oil by the oil seal unit 98. The protruding end of the shaft 78 carries thereon, with provision for lost motion, a double arm lever 100 held by bolt 102 and disk 104 which abuts against the hub of the lever 100. Secured to the rock shaft 78 within the power brake housing is a yoke-shaped member 106 secured by bolts 108. The yoke shaped member 106 has a pair of upwardly extending arms including thrust ends 110 which bear in thrust engagement with and receive movement from the thrust ring 66 carried by the outer displaceable sleeve 56.

From the description as thus far given, it will be understood that rotation of the input rock shaft 76 produced through suitable linkage under the control of the operator causes the frictional retardation of the disk-shaped brake element 42 and the relative rotation of the element 42 which occurs with respect to the shaft will produce, in one direction of rotation, the axial displacement of the outer spiral sleeve 56 alone in a direction to produce a rocking movement of the output rock shaft 78 and in the other direction of rotation the outer sleeve 56 and the intermediate sleeve 54 will be axially displaced together and transmit a rocking movement to the output rock shaft 78. Therefore, in either case whether the vehicle be traveling in forward or reverse directions, the output rock shaft will be turned in a direction to apply the wheel brakes through suitable linkage connected to the double arm brake lever 100. The momentum of the vehicle assists in producing and amplifies the braking force exerted by the operator but does not cause any self-energizing action so the operator can closely control the output brake pressure by the force which he exerts upon the brake pedal.

The development of a commercially satisfactory power brake which will give a smooth and effective braking action when used in association with motor vehicles adapted to travel at the high speeds which are common practice at the present day, is a difficult problem. If a simple input pedal-controlled linkage and an ordinary brake disk is employed, the resulting braking action is not at all desirable since there is a tendency for the operator to apply too much pressure so that the wheel brakes go on too fast and a very careful control of the pressure upon the brake pedal is required to obtain an even and smooth braking action. The improvements of the present invention are designed to make a device commercially satisfactory under all conditions and in which the pedal action is more closely similar to the ordinary braking arrangement without a power brake and an even and smooth braking pressure may be applied to the wheels regardless of the high speed of the vehicle or the inexpertness of the operator. I have, therefore, disclosed in this application, three features of construction which either alone, or in combination, give improved results. First, I disclose the use of a resilient rubber connection in the pedal-controlled linkage to the power brake unit; second, I disclose a dash pot associated with the power brake housing tending to oppose rapid movement of the input rock shaft, and third, I provide an improved resilient construction of the disk-shaped power brake element. These features will be discussed and be described individually.

Figures 10 and 11 illustrate the input brake linkage. An ordinary brake pedal 112 is partially shown carried by a fixed pivot 114 and having an abutment stop 116 for limiting the retracted position of the pedal. The pedal is connected from pivot 118 by an adjustable resilient linkage 122 to pivot 120 carried by the input brake lever 86. The linkage 122 includes a pair of longitudinally separable yoke-shaped members 124—126 which serve to support therebetween a pair of compressible rubber balls. The compressible rubber balls are found to give more desirable resilient action than can be obtained by spring connections.

The input dash pot construction is shown in Figures 4 and 5 and, as shown therein, the input rock shaft 76 has an arm 130 extending therefrom into thrust engagement with a vertically movable dash pot plunger 132 adapted to slide in a fixed cylinder 134 which may be inserted through an opening in the bottom of casing 20 and held in place by a threaded plug 136.

The dash pot piston and the valve arrangement is illustrated in enlarged detail in Figure 5 in which the piston 138 closely fits the cylinder and has suitable peripheral lubricant-receiving grooves. The piston has flow passages 140 extending therethrough adapted to be closed by a ring-shaped valve 142 normally urged into closed position by a spring 144. The spring 144 reacts against and is positioned by a threaded member 146 secured to the lower end of the plunger 132. A stiff compression spring 148 reacts between the lower end of the dash pot plunger and the threaded plug 136. The valve 142 does not entirely prevent the passage of oil above the piston since it has provided therein restricted openings 150 so that the downward movement of the dash pot plunger is not entirely prevented. The up stroke of the dash pot plunger produced by the force of the spring 148 serves to open the valve 142 against the resistance of the spring 144 and allows the free flow of the oil back to the lower part of the dash pot cylinder. It has been found desirable to use a different oil in the dash pot than in the main brake housing and my construction prevents leakage of the oil from the dash pot into the power brake housing, or vice-versa.

The cylinder 134 extends above the normal level of the oil in the power brake housing and the plunger 132 has a cylindrical portion 152 at its upper end which closely co-operates with the walls of the cylinder 134. Immediately below the cylindrical portion 152 an oil seal packing 154 is secured to the plunger. Since the packing 154 moves with the plunger, a constant capacity is maintained in the space between the piston 138 and the packing so that there is no tendency to force oil past the oil seal packing upon either stroke of the plunger. The dash pot presents a resistance tending to prevent a sudden application of the brakes by heavy pressure upon the brake pedal and the resistance to initial movement is taken up in part by the compression of the rubber balls 128 and the extension of the linkage connection from the pedal to the brake lever 86. The dash pot, however, allows the rock shaft to be moved at a proper rate so that the frictional retardation of the disk-shaped brake element 42 will be smoothly and evenly obtained.

The improved resilient construction of the disk-shaped brake element 42 is illustrated in detail in Figures 6 and 7 and a modified construction is shown in Figures 8 and 9. The disk-shaped brake element includes a hub 156 which is keyed for axial movement with respect to the splined sleeve 44 and has secured thereto by rivets 158 a pair of resilient disk-shaped plates 160 which carry at their marginal edges a pair of rings of friction material 162. The best material to be used for the ring-shaped friction linings is found to be woven cotton fabric as it is found this work very well when saturated in oil and is more accurately responsive to pedal pressure. The disks have radial slots 168 and enlarged triangular openings 170 forming independently flexible segments or sectors 163. The friction rings 162 are attached by rivets 172 to the sectors 163. The sectors of the disk plates 160 are initially bent so that the fabric friction linings initially come into contact with the non-rotatable surfaces at the inner edges circular of the lining and as the pressure is increased, the disks 160 collapse to flat forms and the fabric linings 160 are brought into flat engagement with the non-rotatable friction surfaces of the adapter plate and movable brake plate. This is indicated by the enlarged section of Figure 7 wherein the initial separation between the disk member is indicated at 164 adjacent the inner circular edges of the friction disks 162, while the separation at the extreme peripheral edges of the disks 160 is indicated at 166, less than the distance at 164.

In order to give a slightly different braking effect, a modified design, such as illustrated in Figures 8 and 9, may be resorted to. In these figures a pair of brake disks 172 are carried by a central hub 156 similar to the form shown in Figure 7. The disks 172 are bent outwardly from a median plane therebetween starting at a radial point indicated 173, which is at the apex of the triangular openings cut in the disk. The outwardly inclined portions extend to a radial point indicated 174 which is somewhat beyond the inner circular edges of the friction linings 175. From point 174 the disk members bend back towards the median plane to a point indicated 176, from which point the marginal edge of the disk members to the extreme peripheral edge 177 is plane and parallel to the median plane. In released position, as shown in Figure 8, the friction surfaces of the lining rings will be inclined and slightly concave relative to the parallel non-rotatable friction surfaces. As the non-rotatable friction surfaces move together so as to grip the rotatable brake disk, the first tendency will be to contact the inner circular edge of the friction linings and the brake disks will be collapsed until the flat surfaces of the disks between point 176 and 177 come into engagement after which further compression of the brake disk tends to rock the marginal edge about point 176 and thereby bring the outer circular edge of the friction linings into engagement with the non-rotatable friction surfaces so that the greater proportion of frictional retardation will be obtained adjacent the inner and outer edges of the friction linings. This action, to some extent, prevents the tendency of grabbing and, instead, a retardation is obtained. Finally, under heavy pressures, the disks may fully collapse so that an even pressure upon the friction ring is obtained. It will be obvious that a similar construction of a friction gripping member may be used in the design of a clutch as well as in a brake, since a similar smooth engagement will be obtained.

Figure 12:
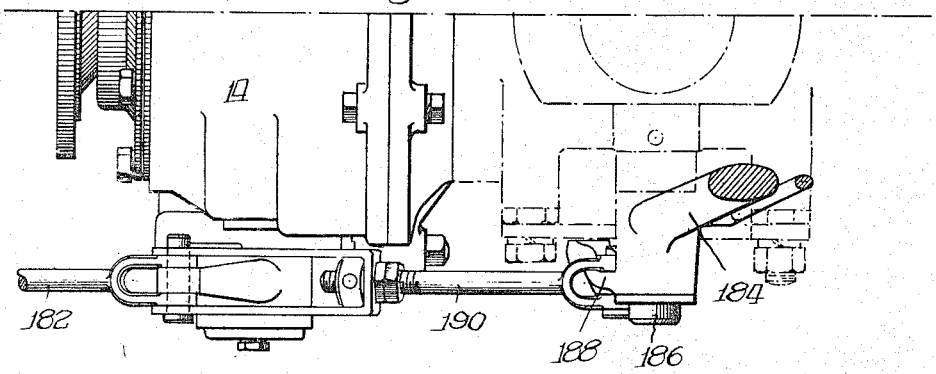
Figure 12 is a plan view of the output linkage and the connection of the emergency brake lever to the power brake device.
Figure 13:
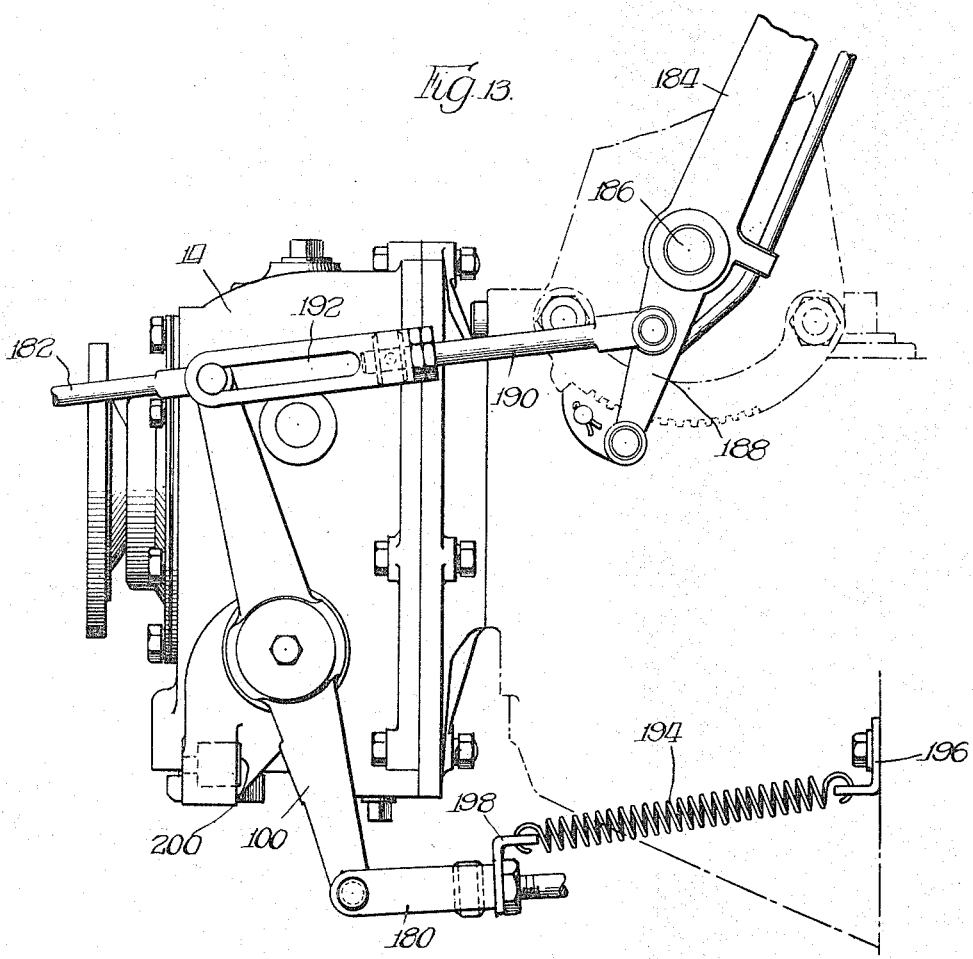
Figure 13 is a side view of the construction shown in Figure 12.

In Figures 12 and 13, a portion of the output brake linkage is illustrated in which the lower end of the double arm output lever 100 is shown connected by linkage 180 extending to the front wheel brakes and the upper end of the lever is connected by linkage 182 to the rear brakes of the vehicle. An emergency lever 184 is shown carried by fixed pivot 186 and has a depending lever arm 188 connected by link 190 to the upper arm of lever 100, in line with linkage 182. The link connection 190 includes a lost motion slot 192 to permit operation of the wheel brakes by a power unit independent of movement of the emergency lever. By the construction described the wheel brakes may be operated independent of the power unit by movement of the emergency lever, since, as previously stated, the lever 100 has a lost motion connection with respect to the output rock shaft 78. A pull-back spring 194 is attached between a bracket 196 on the chassis frame and a bracket 198 in linkage 180, whereby the linkage is normally held in released position.

In applying a power braking device of the type disclosed, it is important not only to build up the pressure, for producing the frictional retardation of the normally rotatable but retardable braking member, gradually, but it is also found desirable to initially apply the pressure at a point towards the axis of the shaft so that the initial leverage or amplifying effect of the proper brake will be as small as possible. For example, if the vehicle is traveling at high speed and a very light pressure is applied to the outer edge of the rotatable disk-shaped brake member, it is found that the slack in the brake linkage will be taken up too rapidly and the wheel brakes will go on with a spanking action. Therefore an important feature of the present invention is that the initial frictional braking pressure is applied to the rotatable disk-shaped member at the inner edge of the friction linings. The adjusted strength of the pull-back springs which normally hold the brake linkage in released position will be dependent to some extent upon the particular dimensions of the disk-shaped braking member and especially the width of the friction lining in order that the light pressure initially applied will have just sufficient leverage to balance the force of the pull-back spring so that the wheel brakes will be applied with a smooth and even braking action.

It is a feature of the invention that as the input pressure is gradually applied to the friction linings of the rotatable disk member, due to the resilient construction of the disk-shaped braking member, an increasing area of frictional contact is obtained and the leverage action or amplifying action is increased due to applying pressure at an increasing radial distance from the axis of the shaft and, in the modified construction, the initial braking pressure may be immediately shifted from the inner edge of the friction lining to the outer edge of the friction lining before the maximum area of frictional contact is obtained.

Should the wheel brake linings be worn out, it is desirable to prevent the brake linkage from moving so far that the spiral sleeves in the power brake unit become locked. Therefore, I show in Figure 13 a rubber stop 200 which limits the operative movement of the output brake lever 100.

I claim:

1. In a power brake construction, a drive shaft, a normally rotatable but retardable braking element carried by said drive shaft, yieldable coupling means between said drive shaft and said normally rotatable but retardable braking element, said yieldable coupling means including an axially displaceable element which is displaced by a relative rotation between said braking element and said shaft, output means moved by the displacement of said axially displaceable element, input means for producing frictional retardation of said brake element, said brake element including a resilient normally flexed plate and a friction ring carried by said plate, said friction ring being initially disposed so that there is an increasing area of frictional contact as the input means is actuated.

2. In a power brake construction a drive shaft, a normally rotatable but retardable braking element associated with said drive shaft, yieldable coupling means between said drive shaft and said braking element, output means associated with said yieldable coupling means normally holding said yieldable coupling means and said braking element for rotation as a unit with said shaft but adapted to be moved by a relative rotation between the brake element and the shaft, input means for producing frictional retardation of said braking element and means producing an increasing area of frictional contact between the input means and the braking element as the input means is moved in a direction for actuation.

3. In a power brake construction, a drive shaft, a resiliently compressible disk-shaped brake element driven by said shaft, input means for producing frictional retardation of said brake element, said input means including a dash pot for regulating the rate of development of frictional pressure on said brake element and output means moved by the frictional retardation of said brake element.

4. In a power brake construction, a drive shaft, a resilient compressible disk-shaped brake element normally rotatable with but retardable with respect to said drive shaft, a non-rotatable but laterally movable pressure plate for producing frictional retardation of said brake element, output means moved by the relative rotation of said brake element with respect to said shaft, input means for producing lateral movement of said pressure plate and dash pot mechanism initially opposing movement of said input means.

5. A power brake device comprising a drive shaft, a normally rotatable but retardable disk-shaped braking member yieldably driven by said shaft, output means for applying secondary brakes moved by relative rotation between said disk-shaped brake member and said shaft, input means for producing frictional retardation of said disk-shaped brake member, said disk-shaped brake member including means for increasing the effective leverage and amplifying action of the pressure applied thereto as the input means is operated.

6. A power brake device comprising a drive shaft, a normally rotatable but retardable disk-shaped braking member yieldably driven by said shaft, output means for applying secondary brakes moved by relative rotation between said disk-shaped brake member and said shaft, input means for producing frictional retardation of said disk-shaped brake member, said disk-shaped brake member including means for increasing the leverage and amplifying action of the braking pressure applied thereto and increasing the effective area of frictional contact as the input means is operated.

7. A power brake device comprising a drive shaft, a normally rotatable but retardable disk-shaped braking member yieldably driven by said shaft, output means for applying secondary brakes moved by relative rotation between said disk-shaped brake member and said shaft, input means for producing frictional retardation of said disk-shaped brake member, said disk-shaped brake member including means for initially producing frictional contact at the inner edges of the friction linings and subsequently at the outer edges of the friction linings as the input means is operated.

8. In a power brake device, a drive shaft, a pair of non-rotatable but relatively laterally movable members having flat braking surfaces in planes perpendicular to the axis of the shaft, a disk-shaped braking element having friction linings on opposite sides thereof carried by said shaft for rotation between said non-rotatable members, means for yieldably driving said disk-shaped braking member from said shaft, output means moved by the relative rotation between said disk-shaped braking member and said shaft, input means for producing relative lateral movement between the non-rotatable members to frictionally grip the disk-shaped braking member, said disk-shaped braking member including means to initially contact the non-rotatable braking surfaces and the friction linings at the inner edges thereof and to increase the effective area of frictional contact with an increasing leverage action as the input pressure upon the non-rotatable braking members is increased.

9. A friction gripping member comprising a hub, a pair of metallic disk members tightly clamped together at their central portions and secured to said hub, fabric friction rings secured to the marginal edges of said disk members on the outside faces thereof, said disk members being normally flexed to a shape in which the disks radially diverge from the clamped central portions to adjacent the inner edges of said friction rings, then radially converge to within a short distance from the outer edges of said friction rings and from there the disks lie in parallel slightly spaced planes.

10. A friction gripping member comprising a hub, a pair of metallic disk members tightly clamped together at their central portions and secured to said hub, said disk members having radial slots inwardly extending from the peripheral edges thereof terminating in triangular shaped openings thereby forming independently flexible marginal segments, fabric friction rings secured to the marginal segments of the disk members on the outside faces thereof, the segments of said disk members being initially flexed to a shape in which the segments radially diverge to adjacent the inner edges of said friction rings, then converge to within a short distance from the outer edges of said friction rings and from there the segments lie in parallel slightly spaced planes.

11. In a power brake construction for motor vehicles, a propeller shaft through which the wheels of the vehicle are driven, a normally rotatable but retardable braking element concentric with said shaft, yieldable coupling means between said shaft and said braking element, said yieldable coupling means including an axially displaceable element which is displaced by a relative rotation between said braking element and said shaft, input means for producing frictional retardation of said braking element, output means moved by the displacement of said axially displaceable element, said braking element comprising a disk-shaped member composed of a pair of metallic normally flexed disks and fabric friction rings secured to the outer faces of said metallic disks.

EDWARD A. ROCKWELL.